United States Patent [19]

Fujimoto

[11] Patent Number: 4,969,544
[45] Date of Patent: Nov. 13, 1990

[54] FRICTION MECHANISM OF LOCK-UP CLUTCH FOR A TORQUE CONVERTER

[75] Inventor: Shinji Fujimoto, Osaka, Japan

[73] Assignee: Kabushiki Kaisha Daikin Seisakusho, Nevagawa, Japan

[21] Appl. No.: 417,154

[22] Filed: Oct. 4, 1989

[30] Foreign Application Priority Data

Oct. 26, 1988 [JP] Japan ................... 63-270185

[51] Int. Cl.$^5$ .................... F16H 45/02; F16D 3/14
[52] U.S. Cl. .................... 192/3.29; 192/106.2
[58] Field of Search ............. 192/3.28, 3.29, 3.3, 192/30 V, 106.1, 106.2

[56] References Cited

U.S. PATENT DOCUMENTS

| | | | |
|---|---|---|---|
| 4,143,561 | 3/1979 | Melhorn | 192/106.2 X |
| 4,289,220 | 9/1981 | Onuma et al. | 192/3.3 |
| 4,437,551 | 3/1984 | Gimmler et al. | 192/3.28 |
| 4,576,260 | 3/1986 | Koshimo | 192/3.29 X |
| 4,580,668 | 4/1986 | Pickard et al. | 192/3.29 |

Primary Examiner—Richard Lorence
Attorney, Agent, or Firm—Armstrong, Nikaido, Marmelstein, Kubovcik & Murray

[57] ABSTRACT

A friction mechanism of a lock-up clutch for a torque converter comprising an annular friction plate installed between a retaining plate and turbine; stud pins fastening the retaining plate to a piston and supporting the friction plate movably with respect to the retaining plate; a friction member installed between the friction plate and retaining plate for generating friction by a relative movement between the friction plate and retaining plate; claw-shaped portions formed at inner periphery of the friction plate and projecting into slits formed in the turbine for connecting the friction plate with turbine rigidly in a circumferential direction and slidably in an axial direction.

14 Claims, 6 Drawing Sheets

FORWARD ←

FRICTION MECHANISM OF LOCK-UP CLUTCH FOR A TORQUE CONVERTER

BACKGROUND OF THE INVENTION

1. Field of the Invention

This invention relates to a friction mechanism for a lock-up clutch for a torque converter.

2. Description of the Related Art

Lock-up clutches of this type have been disclosed, e.g., in the following prior documents: U.S. Pat. No. 4,240,532; Japanese Examined Utility model Publication No. 61-28126; and Japanese Utility model application Nos. 61-170593 and 61-170594.

In such clutches, an input member and an output member, respectively, in the form of a piston and a driven plate, are circumferentially connected with each other by way of damper springs, or compressible coil springs, which absorb torque vibration.

Generally, such torque vibration in the clutch not only depends on the characteristic of the damper springs but also on the friction characteristic of the clutch. Therefore, the torsional vibration will be effectively absorbed when a friction member is arranged so as to generate a hysterisis torque corresponding to a relative movement between the piston and driven plate, or turbine wheel, of the torque converter.

However, such friction member has never been arranged in conventional lock-up clutch, because approximate hysterisis torque can not be determined.

As shown in FIG. 10. another conventional lock-up clutch 100 proposed for solving the above mentioned problem is known. I such lock-up clutch, clutch has an annular flange 103 installed between the turbine 101 and piston 102 and connected to turbine 101. A pair of side plates 104 and 105 are disposed at opposite sides of the flange 103. A friction member, consisting of a friction material 106 and a friction washer 107, is installed in at least one of the spaces formed between side plate 104 and the flange 103 and between flange 103 and side plate 105.

In such structure, the clutch 100 becomes complex because of the flange 103 and side plates 104 and 105. Thus, the cost of the clutch and total weight increases.

SUMMARY OF THE INVENTION

Accordingly, it is an object of this invention to provide an improved friction mechanism for a lock-up clutch for a torque converter, overcoming the above mentioned disadvantages, and comprising an annular friction plate installed between an annular retaining plate and turbine; stud pins fastening the retaining plate to a piston and supporting the friction plate movably with respect to the retaining plate; a friction member installed between the friction plate and retaining plate for generating friction by a relative movement between the friction plate and retaining plate; claw-shaped portions formed at inner periphery of the friction plate and projecting integrally toward the turbine for connecting the friction plate with the turbine, rigidly in a circumferential direction and slidably in an axial direction.

Other and further objects, features and advantages of the present invention will appear more fully from the following description of the preferred embodiments of the invention.

DESCRIPTION OF THE PREFERRED EMBODIMENT

In the following explanation in FIGS. 1, 2, 4, 7 and 8, the left side of the figures are regarded as the forward direction.

Figure 1:
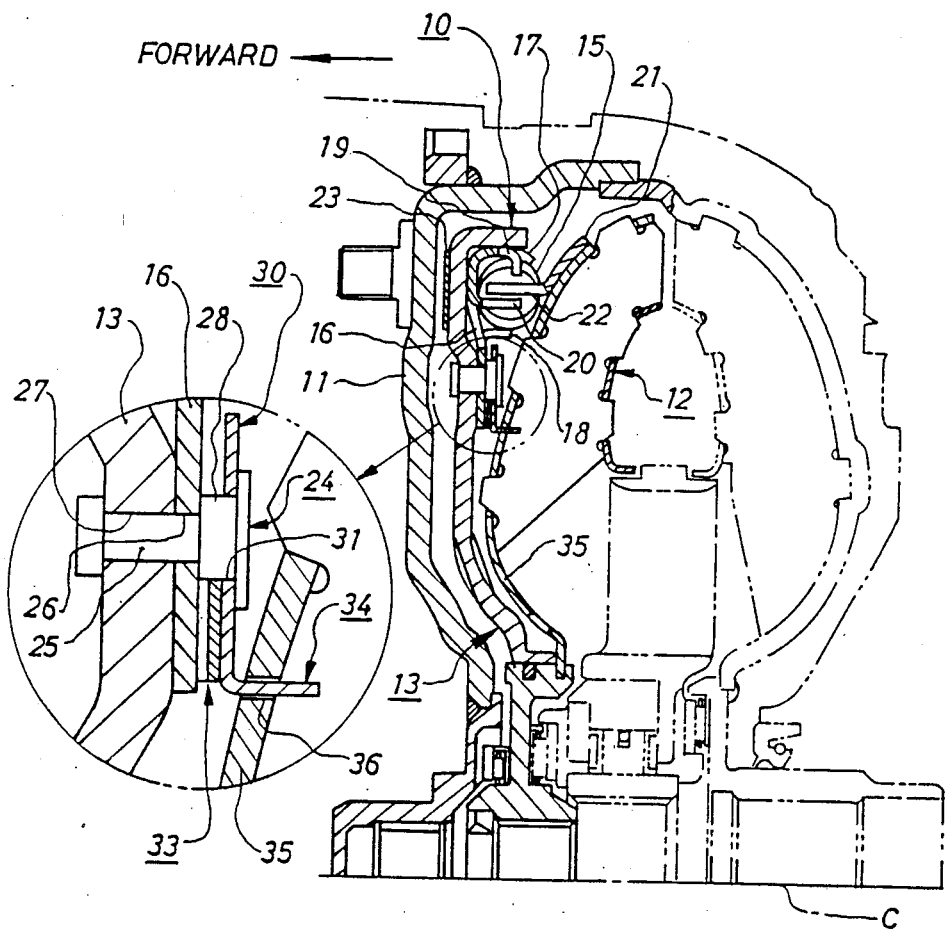
FIG. 1 is a partial sectional view of the present invention.
Figures 2, 3:
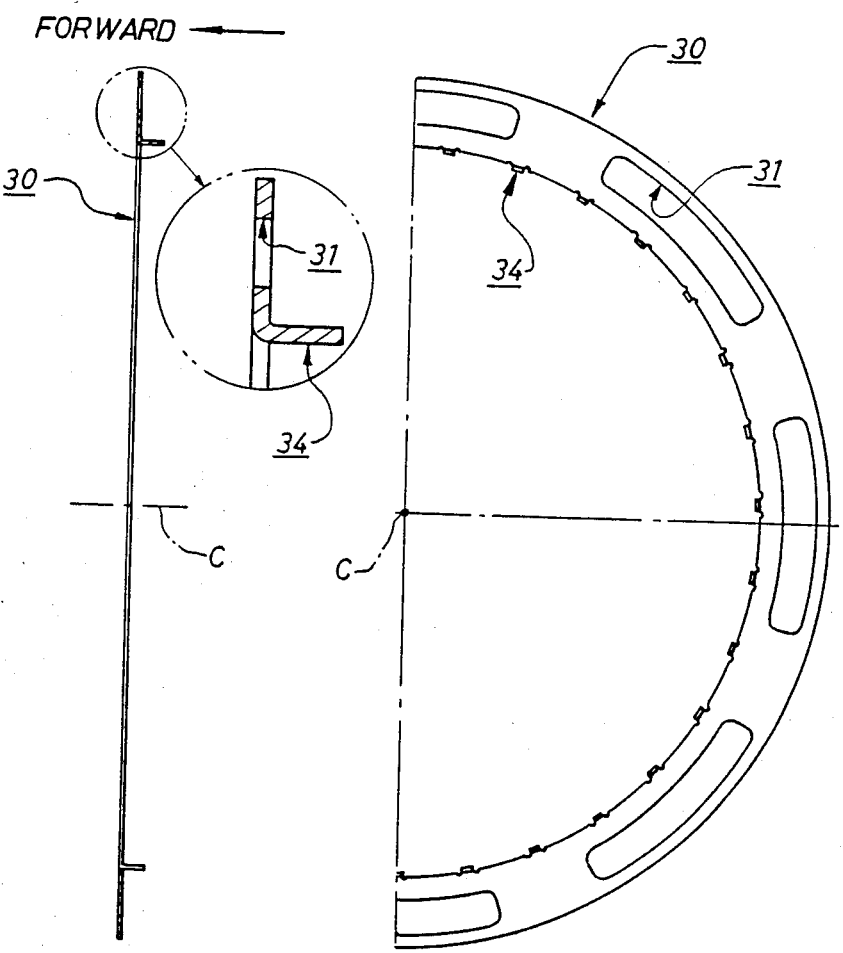
FIG. 2 is a longitudinal sectional view of the friction plate of the present invention.
FIG. 3 is a partially cut-away front view of the friction plate of the present invention.
Figure 4:
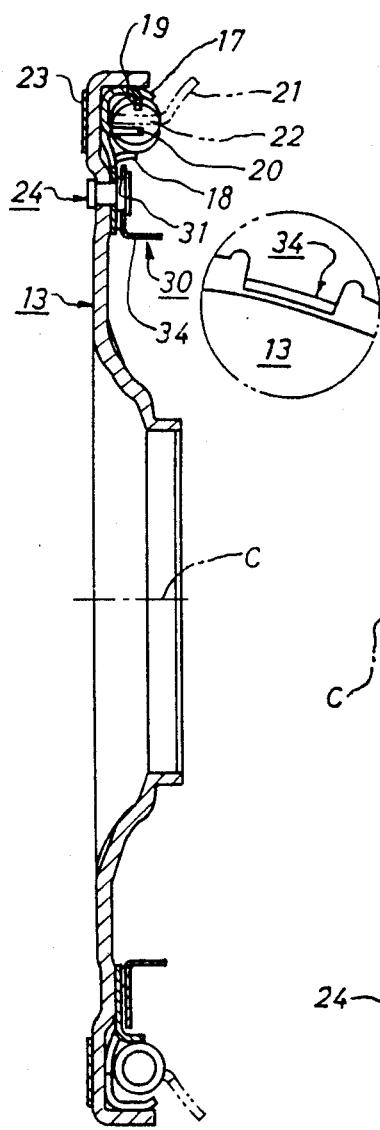
FIG. 4 is a longitudinal sectional view of the lock-up clutch of the present invention.

As shown in FIG. 1, a lock-up clutch 10 of the present invention is installed between an input member in the form of a front cover 11 and turbine 12 of torque converter.

The lock-up clutch 10 has an annular plate-shaped piston 13 and a sets of damper springs, or coil springs, 15.

Figure 5:
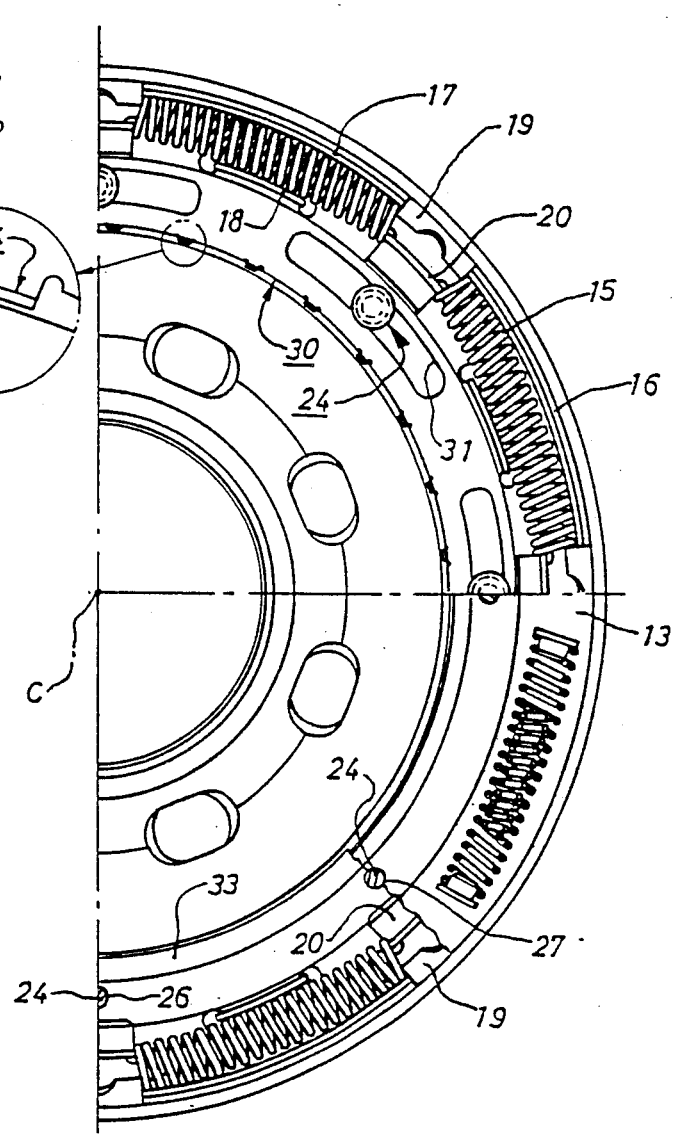
FIG. 5 is a partially cut-away front view of the lock-up clutch of the present invention.

The piston 13 has a retaining plate 16 fixed to an outer peripheral rear side of the piston 13 for supporting the coil spring 15 near the rear side of the piston 13. The retaining plate 16 is formed into annular shape concentrically along with a circumferential direction of the torque converter. The retaining plate 16 has claws 17, 18, 19 and 20. Claws 17 and 18 are respectively extending inwardly and outwardly in a radial direction for holding the coil springs 15. Claws 19 and 20 are respectively extending inwardly and outwardly in the radial direction and aligning with the ends of abutting coil springs 15 in the circumferential direction (FIG. 5).

Figures 6, 7:
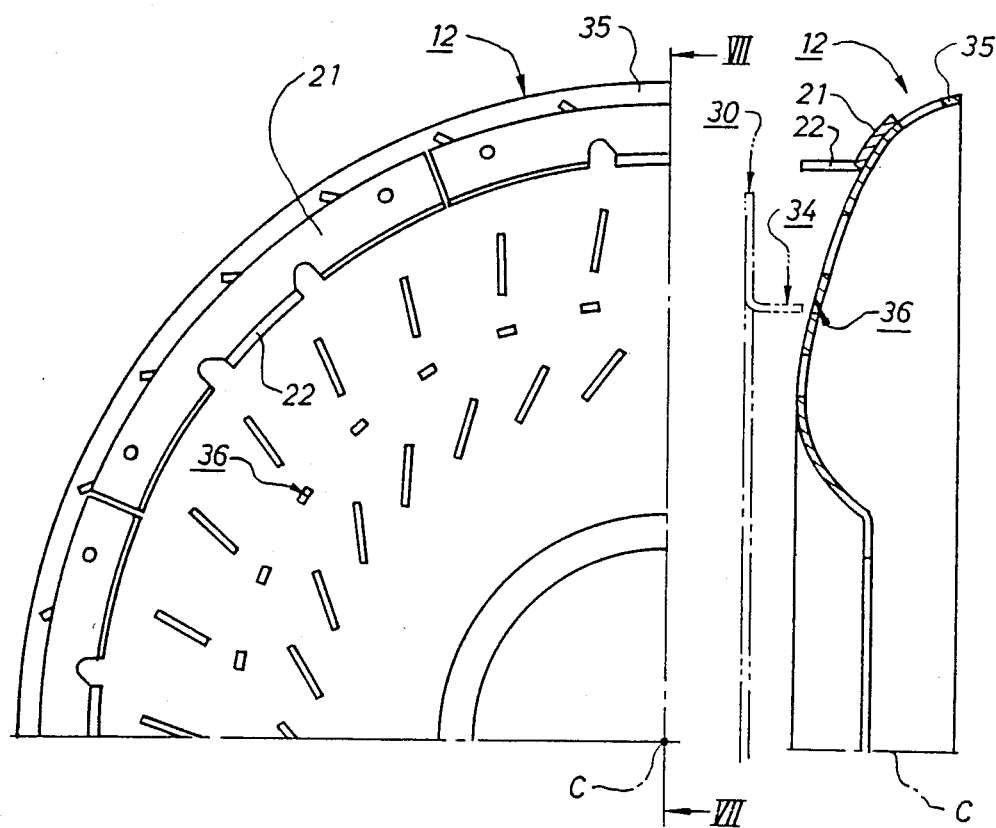
FIG. 6 is a partial front view of the turbine which can be employed in the present invention.
FIG. 7 is a sectional view taken along line VII—VII of FIG. 6.

The turbine 12 has a shell 35 having an outer peripheral front surface on which driven plates 21 are circumferentially located. Each driven plate 21 is fixed on the front surface, e.g., by spot welding (FIG. 6). The driven plates 21 have an inner peripheral projection 22 extending forwardly and aligning with the ends of abutting springs 15 for connecting the turbine 12 to the piston 13, elastically in the circumferential direction, by way of the springs 15 and claws 19 and 20.

The piston 13 has an outer peripheral front surface to which is bonded an annular friction lining 23 aligned with an outer peripheral rear surface of the front cover 11 in a direction of axis C. The lining 23 is pressed onto the rear surface of front cover 11 by a hydraulic pressure forwardly applied to the piston 13.

Referring the left side of FIG. 1, stud pins 24 connect the retaining plate 16 to the piston 13. Each stud pin 24 has a small diameter portion 25 which pass through the holes 26 and 27, formed in an inner periphery of the retaining plate 16 and in a relatively outer periphery of the piston 13, respectively. Each stud pin 24 also has a large diameter portion 28 which passes through a circumferentially elongated holes 31, described later, formed in a friction plate 30. The circumferential length of the elongated holes 31 determines a torsion angle of the friction plate 30.

Figure 8:
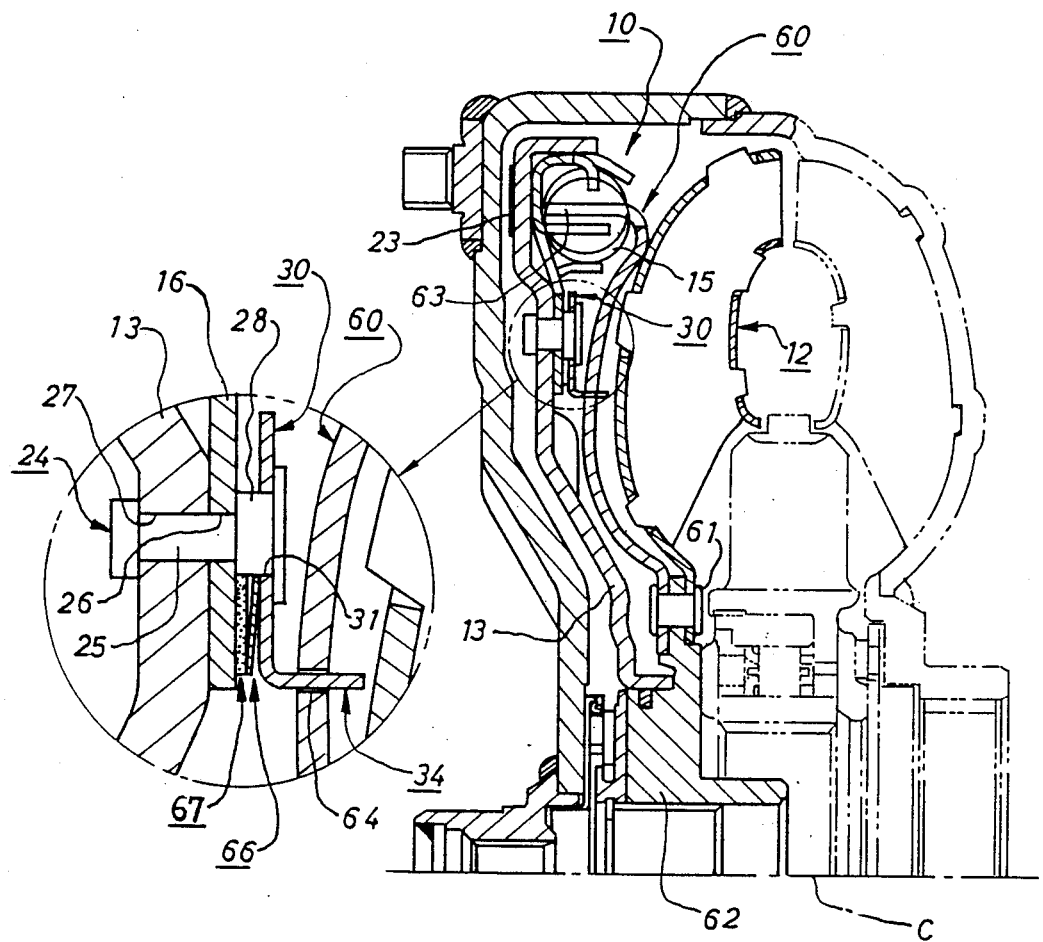
FIG. 8 is a partial sectional view of another embodiment of the present invention.

A wave spring 33 is installed between the friction plate 30 and retaining plate 16 inwardly from the stud pins 24. The wave spring 33 works as a friction member and generates friction during the relative movement between the friction plate 30 and retaining plate 16. Spring 33 may be in the form of a Belleville spring, such as at 66, in FIG. 8. The friction member may also include member 67 of friction material 67, as shown in FIG. 8, when there is ample space in the axial direction.

As shown in FIGS. 2, 3, 4 and 5, the friction plate 30 has formed therein a series of elongated holes 31 circumferentially extending and locating, e.g., at eight places with equal distance therebetween. A series of elongated recesses, extending in the circumferential direction, may be formed in the friction plate 30 instead of the elongated holes 31. The friction plate 30 has a series of inner peripheral claw-shaped projections 34 extending backwardly for fitting in the corresponing slits 36 formed in the turbine shell 35 (FIG. 7).

As shown in FIGS. 6 and 7, the slits 36 are located in the circumferential direction with equal distances therebetween and aligned with the corresponding claw-shaped projections 34 in the axial direction (FIG. 7). Each slit 36 is sized to allow the claw-shaped projections 34 to slide in the axial direction and to inhibit the claw-shaped projections 34 from moving in the circumferential direction. Thus, the friction plate 30 is connected with the turbine 12 rigidly in a circumferential direction and slidably in an axial direction.

The operation of this embodiment is as follows. When the piston 13 is urged forwardly by the hydraulic pressure from the released condition, as shown in FIG. 1, the clutch is engaged, and piston 13 twists with respect to the turbine 12 by the circumferential compression of coil springs 15. In this relative movement, the friction plate 30 moves simultaneously with turbine 12 because friction plate 30 is rigidly connected with the turbine 12 in a circumferential direction and slidably in an axial direction by the claw-shaped projections 34. Thus, friction plate 30 moves with respect to the piston, and the friction member, in the form of the wave spring 33, generates friction.

In this invention, as explained above, because of the friction member, in the form of the wave spring 33, in the preferred embodiment, this invention enables accurate determination of the hysterisis torque.

This invention also enable obtaining relative large friction load despite the narrow friction area because the friction member is located between the retaining plate 16 and friction plate 30 which are relatively outwardly disposed on the rear surface of the piston 13. Thus, the durability of the friction can be improved by determining the small load in the axial direction.

Figure 10:
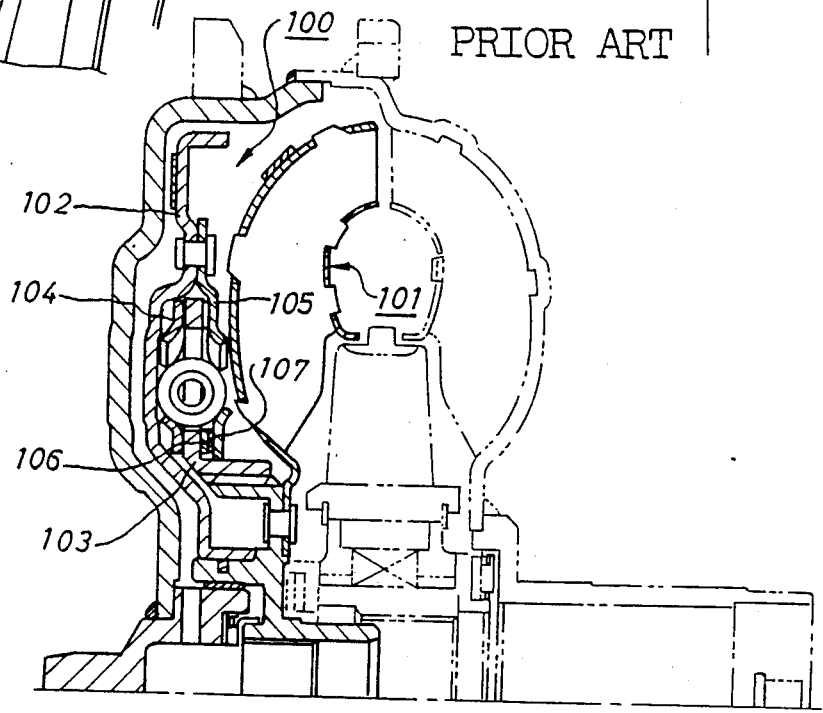
FIG. 10 is a partial sectional view of a conventional arrangement.

This invention further enable less expensively and lighter weight manufacture because the number and weight of parts is less than the conventional arrangement in FIG. 10.

This invention further enable the manufacture of inexpensive productions because the claw-shaped projections 34 can be formed on the friction plate 30 at the time of manufacture e.g., by press work.

In the embodiment in FIG. 8, an annular driven plate 60 is disposed between lock-up clutch 10 and turbine 12.

The driven plate 60 has an inner periphery fixed to an outer periphery of the turbine hub 62 by a series of rivets 61. The driven plate 60 has a series of outer peripheral projections 63 aligning with the ends portion of the abutting coil springs 15 of the lock-up clutch 10 for elastically connecting the lock-up clutch 10 with the turbine 12 in the circumferential direction. The lock-up clutch 10 has a friction member comprising the friction plate 30, a Belleville spring 66 and a friction material 67.

Figure 9:
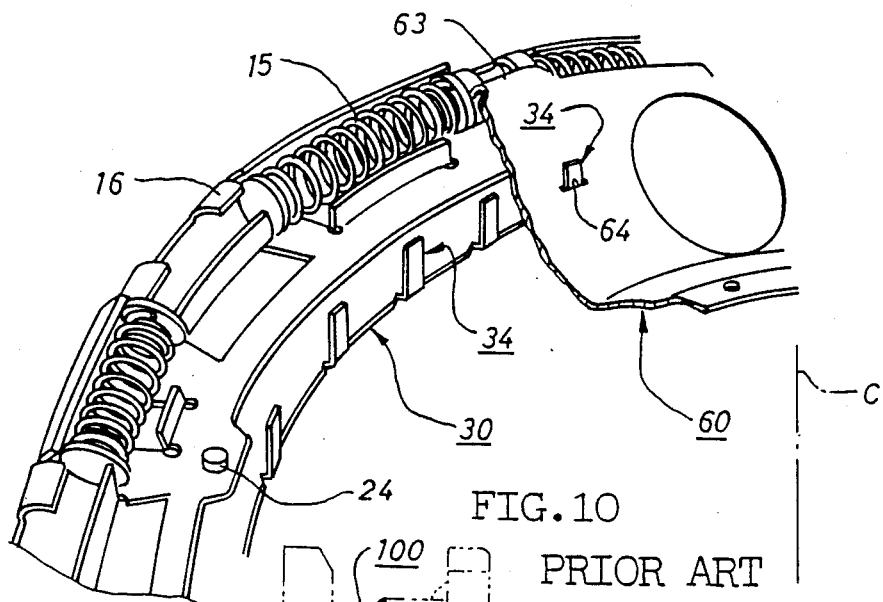
FIG. 9 is a partially cut-away perspective view of the lock-up clutch of the present invention.

As shown in FIG. 9, the driven plate 60 has slits 64 aligning with the claw-shaped projections 34 of friction plate 30 in the axial direction. The claw-shaped projections 34 of the friction plate 30 are fitted in the slits 64. The slits 64 are sized to allow the claw-shaped projections 34 to slide in the axial direction and to inhibit the claw-shaped projections 34 from moving in the circumferential direction in the same manner as the slits 36 in FIGS. 6 and 7.

According to the embodiment in FIGS. 8 and 9, the piston 13 moves with respect to the driven plate 60 by the circumferential compressed quantity of the coil springs 15 when the clutch is engaged. Therefore, the piston 13 will move with respect to the turbine 12. In the relative movement, the friction plate 30 will move with turbine 12 simultaniously because the friction plate 30 is connected with the turbine 12 rigidly in the circumferential direction and slidably in the axial direction by the claw-shaped projections 34. Thus, the friction member will generate friction.

Although the present invention has been described in its preferred form, it is understood that the present disclosure of the preferred form may be changed in the details of construction and the combination and arrangement of parts may be resorted to without departing from the spirit and scope of the invention as hereinafter claimed.

What is claimed is:

1. A lock-up clutch for a torque converter comprising: an annular plate-shaped piston engageable with a front cover of said torque converter for connecting said front cover to a turbine of the torque converter; damper springs for elastically connecting said turbine to said piston in a circumferential direction; a retaining plate fastened to the piston for holding said damper springs; and a friction mechanism including an annular friction plate disposed between said retaining plate and turbine, stud pins fastening said retaining plate to said piston and supporting said friction plate movably with respect to said retaining plate, a friction member disposed between said friction plate and said retaining plate for generating friction by relative movement between said friction plate and said retaining plate and claw-shaped portions integrally formed at an inner periphery of said friction plate and projecting into slits formed in one of said turbine or a member rigidly secured to said turbine for rigidly connecting said friction plate with said turbine in a circumferential direction and slidably in an axial direction.

2. A friction mechanism of a lock-up clutch for a torque converter as set forth in claim 1, wherein said friction member includes a member of friction material.

3. A friction mechanism of a lock-up clutch for a torque converter as set forth in claim 1 or 2, wherein said friction member includes a spring mechanism.

4. A friction mechanism of a lock-up clutch for a torque converter as set forth in claim 3, wherein said spring mechanism is a wave spring.

5. A friction mechanism of a lock-up clutch for a torque converter as set forth in claim 3, wherein said spring mechanism is a Belleville spring.

6. A friction mechanism of a lock-up clutch for a torque converter as set forth in claim 1, wherein said stud pins have a small diameter portion passing through said piston and retaining plate and a large diameter portion passing through said friction plate.

7. A friction mechanism of a lock-up clutch for a torque converter as set forth in claim 6, wherein said large diameter portion passes through a circumferentially elongated hole formed in said friction plate.

8. A friction mechanism of a lock-up clutch for a torque converter as set forth in claim 1, wherein said stud pins are located radially outwardly from said friction member.

9. A friction mechanism of a lock-up clutch for a torque converter as set forth in claim 1, wherein said piston has a inner periphery slidable mounted on a hub of said turbine.

10. A friction mechanism of a lock-up clutch for a torque converter as set forth in claim 1, wherein said retaining plate has first claws extending in a radial direction for holding said coil springs and second claws aligned with the end of abutting coil springs in the circumferential direction.

11. A friction mechanism of a lock-up clutch for a torque converter as set forth in claim 10, wherein said retaining plate has an inner periphery located radially inwardly from said first and second claws.

12. A friction mechanism of a lock-up clutch for a torque converter as set forth in claim 1, wherein said claw-shaped projections are fitted into slits formed in a shell of said turbine.

13. A friction mechanism of a lock-up clutch for a torque converter as set forth in claim 1, wherein said claw-shaped projections are fitted into slits formed in a driven plate riveted to said turbine between said turbine and said piston.

14. A friction mechanism of a lock-up clutch for a torque converter as set forth in claim 13, wherein said driven plate has an inner periphery fixed to an outer periphery of said turbine hub.

* * * * *